United States Patent [19]

Sakamoto et al.

[11] Patent Number: 5,348,840

[45] Date of Patent: Sep. 20, 1994

[54] OPTICAL RECORDING MEDIUM

[75] Inventors: Makoto Sakamoto; Michiko Tamano, both of Tokyo, Japan

[73] Assignee: Toyo Ink Manufacturing Co., Ltd., Tokyo, Japan

[21] Appl. No.: 56,537

[22] Filed: May 5, 1993

[51] Int. Cl.$^5$ .............................................. G03C 1/72
[52] U.S. Cl. .................................. 430/270; 430/495; 430/945; 540/128; 540/139; 540/140
[58] Field of Search ............... 430/270, 495, 945; 540/140, 128, 139

[56] References Cited

U.S. PATENT DOCUMENTS 5,199,922  2/1993  Hayashida et al. ................ 430/270

FOREIGN PATENT DOCUMENTS

| | | |
|---|---|---|
| 0357360 | 3/1990 | European Pat. Off. . |
| 0379277 | 7/1990 | European Pat. Off. . |
| 0463550 | 1/1992 | European Pat. Off. . |
| 0492508 | 7/1992 | European Pat. Off. . |
| 0527454 | 2/1993 | European Pat. Off. . |

*Primary Examiner*—Thorl Chea
*Attorney, Agent, or Firm*—Wenderoth, Lind & Ponack

[57] ABSTRACT

An optical recording medium which has physical and chemical stability, has high sensitivity to laser light and permits accurate recording and highly reliable reproduction. The medium comprises a transparent substrate and a recording layer formed on the substrate, the recording layer being formed of an organic thin layer containing at least one of phthalocyanine compounds of the formula [1].

4 Claims, No Drawings

OPTICAL RECORDING MEDIUM

BACKGROUND OF THE INVENTION

1. Field of the Invention

The present invention relates to an optical recording medium on which data is written and read by means of laser light.

2. Prior Art

A variety of media are conventionally available for recording data with laser light, and among them is a medium whose recording layer is irradiated with laser light for locally heating the recording layer and causing a physical or chemical change such as melting, evaporation, sublimation or decomposition on an irradiated portion, i.e., for forming pits to record data.

The thin layer as the recording layer of the above optical recording medium is generally formed from any one of metals such as As, Te, Se and Ti or an alloy of at least two of them. However, the optical recording medium using the thin layer of any one of the above metals or the above alloy as a recording layer has the following defect. Since the recording layer has high thermal conductivity, long and narrow pits expand too wide in the width direction when formed for recording, and a pit-length modulation method for high-density recording cannot be applied.

On the other hand, for example, U.S. Pat. Nos. 4,622,179, 4,725,525, 4,492,750 or 4,458,004 discloses an optical recording medium whose recording layer is formed of an organic dyestuff having low thermal conductivity for applying the pit-length modulation method. However, the recording media disclosed in the above U.S. Patents are not yet satisfactory since the proposed organic dyestuffs still fax I to give a recording layer having excel lent physical and chemical stability.

Further, JP-A-2-42652 or JP-A-2-147,286 discloses an optical disc obtained by consecutively laminating a transparent substrate, a recording layer formed of an organic dyestuff, a reflection film and a protection film as an optical recording medium compatible with CD or CD-ROM on which data can be recorded by an eight-to-fourteen modulation (EFM) method based on pit-length modulation.

Cyanine compounds have been studied as the organic dyestuff for forming the recording layer of the above optical disc, and some of them have been put to practical use. In general, however, the cyanine compounds have poor light resistance and may cause a problem on recording reliability, and optical recording media using recording layer formed of cyanine compounds do not always have the device life equivalent to that of usual CD or CD-ROM.

SUMMARY OF THE INVENTION

It is an object of the present invention to provide an optical recording medium whose recording layer is formed of a specific phthalocyanine compound, and which has physical and chemical stability, has high sensitivity to laser light, and permits accurate recording and highly reliable reproduction.

According to the present invention, the above object and advantages of the present invention are achieved by an optical recording medium comprising a transparent substrate and a recording layer formed on the substrate, the recording layer being formed of an organic thin layer containing at least one phthalocyanine compound of the formula [1],

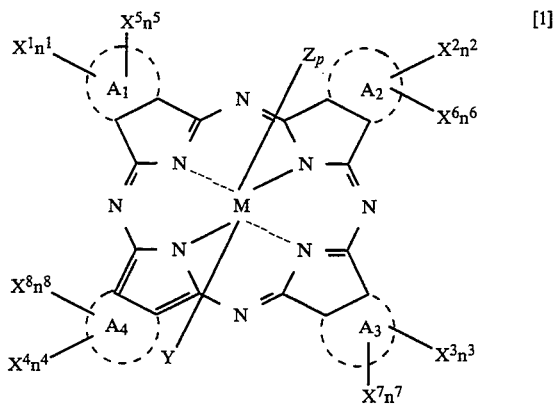

wherein:
each of rings $A^1$ to $A^4$ is independently a benzene ring or a naphthalene ring,
M is Al, Ga, In, Si, Ge or Sn,
each of $X^1$ to $X^8$ is independently a hydrogen atom, an optionally substituted alkyl group, an optionally substituted aryl group, an optionally substituted aralkyl group, an optionally substituted heterocyclic ring residue, an optionally substituted phthalimidemethyl group, a halogen atom, a nitro group, a cyano group, a sulfonic acid group, $-OR^1$, $-SR^2$, $-COOR^3$, $-NR^4R^5$, $-SO_2NR^6R^7$, $-CONR^8R^9$, $CH_2NHCOCH_2NR^{10}R^{11}$, $-NHCOR^{12}$, $-N=NR^{13}$ or $-N=CHR^{14}$, in which each of $R^1$, $R^2$, $R^3$, $R^4$, $R^5$, $R^6$, $R^7$, $R^8$, $R^9$, $R^{10}$ and $R^{11}$ is independently a hydrogen atom, an optionally substituted alkyl group, an optionally substituted aryl group, an optionally substituted acyl group, an optionally substituted cycloalkyl group or an optionally substituted polyether group, provided that a combination of $R^6$ and $R^7$, a combination of $R^8$ and $R^9$ or a combination of $R^{10}$ and $R^{11}$ may form a four to seven-membered ring which may contain a nitrogen atom as a heteroatom, and each of $R^{12}$, $R^{13}$ and $R^{14}$ is an optionally substituted alkyl group, an optionally substituted cycloalkyl group or an optionally substituted aryl group, Y is

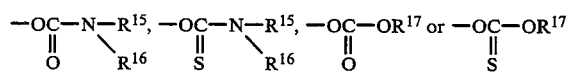

Z is a hydrogen atom, a halogen atom, a hydroxyl group, an optionally substituted alkyl group,

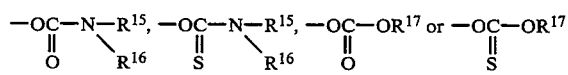

in which each of $R^{15}$, $R^{16}$ and $R^{17}$ is independently a hydrogen atom, an optionally substituted linear, branched or cyclic alkyl group, an optionally substituted aryl group or an optionally substituted aralkyl group, provided that a combination of $R^{15}$ and $R^{16}$ may form a heterocyclic group containing a heteroatom,
each of $n^1$ to $n^8$ is independently an integer of 0 to 8, and p is 0 or 1.

DETAILED DESCRIPTION OF THE INVENTION

In the phthalocyanine compounds of the formula used in the present invention, the substituents Y and Z are introduced in the direction at right angles with the molecular plane of the phthalocyanine ring, Y is

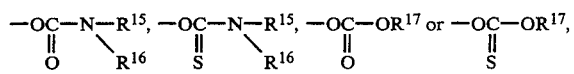

and Z is a hydrogen atom, a halogen atom, a hydroxyl group, an optionally substituted alkyl group,

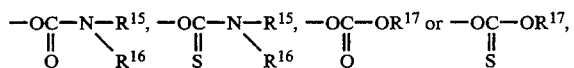

in which each of $R^{15}$, $R^{16}$ and $R^{17}$ is independently a hydrogen atom, an optionally substituted linear, branched or cyclic alkyl group, an optionally substituted aryl group or an optionally substituted aralkyl group, provided that a combination of $R^{15}$ and $R^{16}$ may form a heterocyclic group containing a heteroatom.

Typical examples of the above optionally substituted linear, branched or cyclic alkyl group include methyl, ethyl, hexyl, dodecyl, isopropyl, 2-ethylhexyl, tert-butyl, neopentyl, trichloromethyl, 1,2-dichloroethyl, trifluoromethyl, heptafluoropropyl, 2,2,3,3-tetrafluoropropyl, 2-methoxyethyl, cyclohexyl and adamantyl.

Typical examples of the above optionally substituted aryl group include phenyl, naphthyl, 3-methylphenyl, 3-methoxyphenyl, 3-fluorophenyl, 3-trichloromethylphenyl, 3-trifluoromethylphenyl, pentafluorophenyl and 3-nitrophenyl.

Typical examples of the above optionally substituted aralkyl group include benzyl, o-nitrobenzyl and 2-chloro-4-dimethylaminobenzyl.

In the phthalocyanine compounds of the formula [1], used in the present invention, each of $X^1$ to $X^8$ is independently a hydrogen atom, an optionally substituted alkyl group, an optionally substituted aryl group, an optionally substituted aralkyl group, an optionally substituted heterocyclic ring residue, an optionally substituted phthalimidemethyl group, a halogen atom, a nitro group, a cyano group, a sulfonic acid group, $-OR^1$, $-SR^2$, $-COOR^3$, $-NR^4R^5$, $-SO_2NR^6R^7$, $-CONR^8R^9$, $-CH_2NHCOCH_2NR^{10}R^{11}$, $-NHCOR^{12}$, $-N=NR^{13}$ or $-N=CHR^{14}$.

Examples of the above halogen atom include chlorine, bromine, iodine and fluorine.

Examples of the above optionally substituted alkyl group include methyl, n-butyl, tert-butyl, stearyl, trichloromethyl, trifluoromethyl, 2-methoxyethyl and phthalimidemethyl.

Examples of the above optionally substituted aryl group include phenyl, naphthyl, p-nitrophenyl and p-tert-butylphenyl.

Examples of the above aralkyl group include benzyl, o-nitrobenzyl and 2-chloro-4-dimethylaminobenzyl.

Examples of the optionally substituted alkoxy group include methoxy, ethoxy, n-butoxy, tert-butoxy, 2-ethylhexyloxy, 2,2,2-trichloroethoxy, 2,2,2-trifluoroethoxy, 2,2,3,3-tetrafluoropropoxy, 2,2,3,3,3-pentafluoropropoxy, 1,1,1,3,3,3-hexafluoro-2-propoxy, 2,2,3,4,4,4-hexafluorobutoxy, 1H,1H,5H-octafluoropentoxy, 1H,1H,7H-dodecafluoroheptoxy, 1H,1H,9H-hexadecafluorononyloxy, 2-(perfluorohexyl)ethoxy, 2-(perfluorooctyl)ethoxy, 2-(perfluorodecyl)ethoxy, 2-(perfluoro-3-methylbutyl)ethoxy, 9-(perfluoroethyl)hexyloxy and 6-(perfluorohexyl)hexyloxy.

Examples of the optionally substituted aryloxy group include phenoxy, p-nitrophenoxy, p-tert-butylphenoxy, 3-fluorophenoxy, pentafluorophenyl and 3-trifluoromethylphenoxy.

Examples of the optionally substituted alkylthio group include methylthio, ethylthio, tert-butylthio, hexylthio, octylthio and trifluoromethylthio.

Examples of the optionally substituted arylthio group include phenylthio, p-nitrophenylthio, p-tert-butylphenylthio, 3-fluorophenylthio, pentafluorophenylthio and 3-trifluorophenylthio.

In the present invention, particularly preferred are the compounds of the formula in which $X^1$ to $X^8$ are fluorine-substituted alkoxy.

In the above definitions of $X^1$ to $X^8$, each of $R^1$, $R^2$, $R^3$, $R^4$, $R^5$, $R^6$, $R^7$, $R^8$, $R^9$, $R^{10}$ and $R^{11}$ is independently a hydrogen atom, an optionally substituted alkyl group, an optionally substituted aryl group, an optionally substituted acyl group, an optionally substituted cycloalkyl group or an optionally substituted polyether group, provided that a combination of $R^6$ and $R^7$, a combination of $R^8$ and $R^9$ or a combination of $R^{10}$ and $R^{11}$ may form a four to seven-membered ring which may contain a nitrogen atom as a heteroatom.

Examples of the above optionally substituted alkyl group include those described above.

Examples of the above optionally substituted aryl group include those described above.

Further, in the above definitions of $X^1$ to $X^8$, each of $R^{12}$, $R^{13}$ and $R^{14}$ is an optionally substituted alkyl group, an optionally substituted cycloalkyl group or an optionally substituted aryl group.

Examples of the above optionally substituted alkyl group include those described above.

In the present invention, the phthalocyanine compounds of the formula [1] can be produced by the following method.

That is, the compound of the formula [2] or [3] and a salt of the metal which will be the central metal, M, in the formula [1] are used as raw materials, and allowed to react by a conventional method to prepare the hydroxy-form phthalocyanine compound of the formula [4].

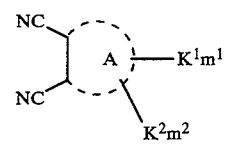

[2]

wherein A has the same meaning as $A^1$ to $A^4$ in the formula [1], K has the same meaning as $X^1$ to $X^8$ in the formula [1], and each of $m^1$ and $m^2$ has the same meaning as $n^1$ to $n^8$ in the formula [1].

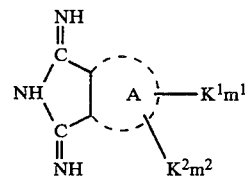

[3]

wherein A has the same meaning as $A^1$ to $A^4$ in the formula [1], K has the same meaning as $X^1$ to $X^8$ in the formula [1], and each of $m^1$ and $m^2$ has the same meaning as $n^1$ to $n^8$ in the formula [1].

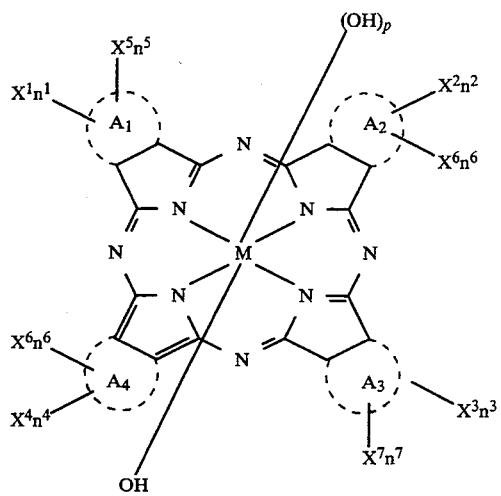

[4]

wherein $X^1$ to $X^8$, $n^1$ to $n^8$ and p are as defined in the formula [1].

For producing the phthalocyanine compounds containing the central metal, M, of Al, Ga or In, the dicarboxylic acid of the following formula [2-1], the dicarboxylic anhydride of the following formula [2-2] and the imide compound of the following formula [2-3] may be used as raw materials.

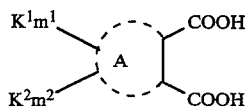

[2-1]

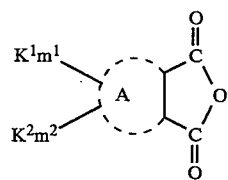

[2-2]

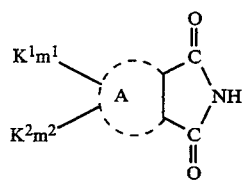

[2-3]

wherein A has the same meaning as $A^1$ to $A^4$ in the formula [1], K has the same meaning as $X^1$ to $X^8$ in the formula [1], and each of $m^1$ and $m^2$ has the same meaning as $n^1$ to $n^8$ in the formula [1].

Further, when least two compounds of the formula [2] or [3] which have different rings A or different substituents $K^1$ and $K^2$ are allowed to react with the above metal salt, an asymmetric hydroxy phthalocyanine compound can be obtained as the compound of the formula [4].

Then, the above hydroxy-form phthalocyanine compound of the formula [4] is allowed to react with a reagent to obtain the phthalocyanine compound of the formula [1]. The reagent is selected from halogenated thiocarboxylic acids, isocyanates, isothiocyanates and halogenated carbamines.

Typical examples of the phthalocyanine compounds of the formula [1] include the following phthalocyanine compounds (1) to (28), although the phthalocyanine compounds of the present invention shall not be limited to them.

Phthalocyanine compound (1)

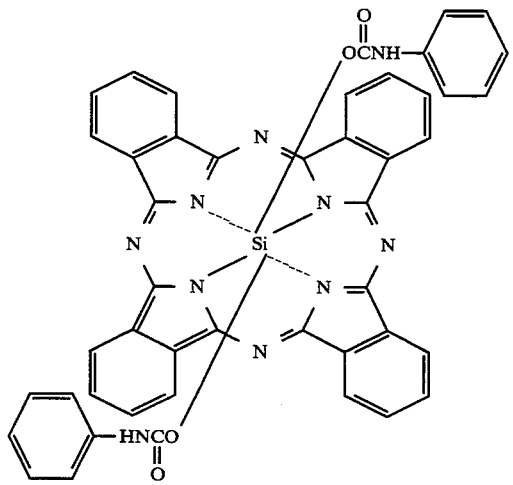

Phthalocyanine compound (2)

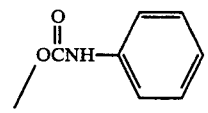

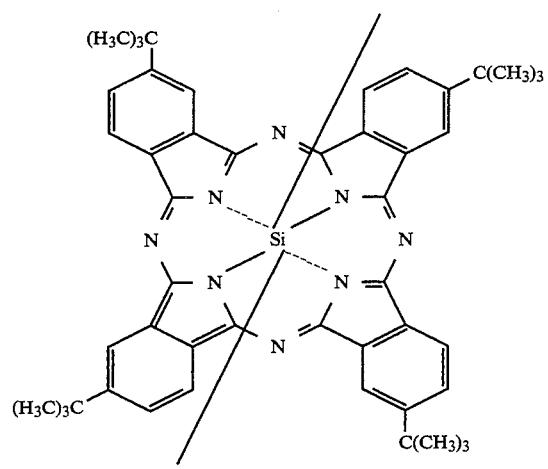
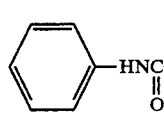
Phthalocyanine compound (3)
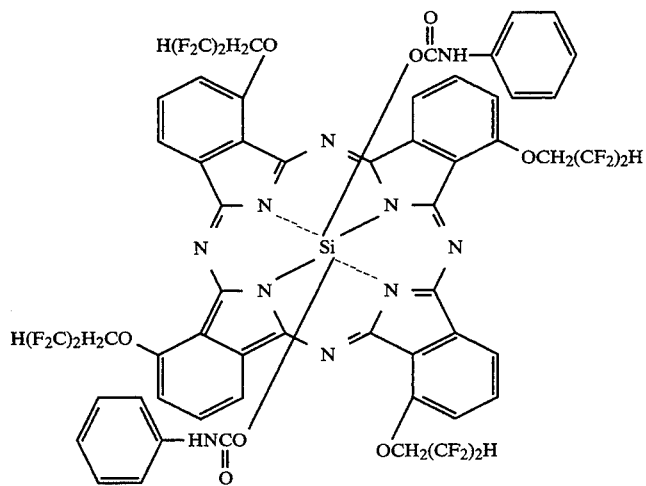
Phthalocyanine compound (4)
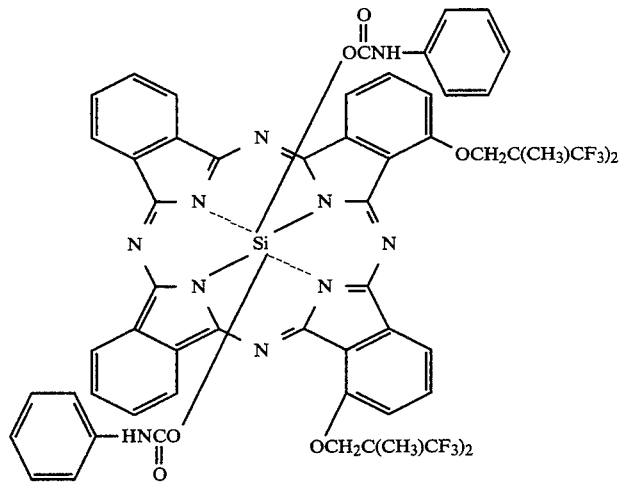
Phthalocyanine compound (5)

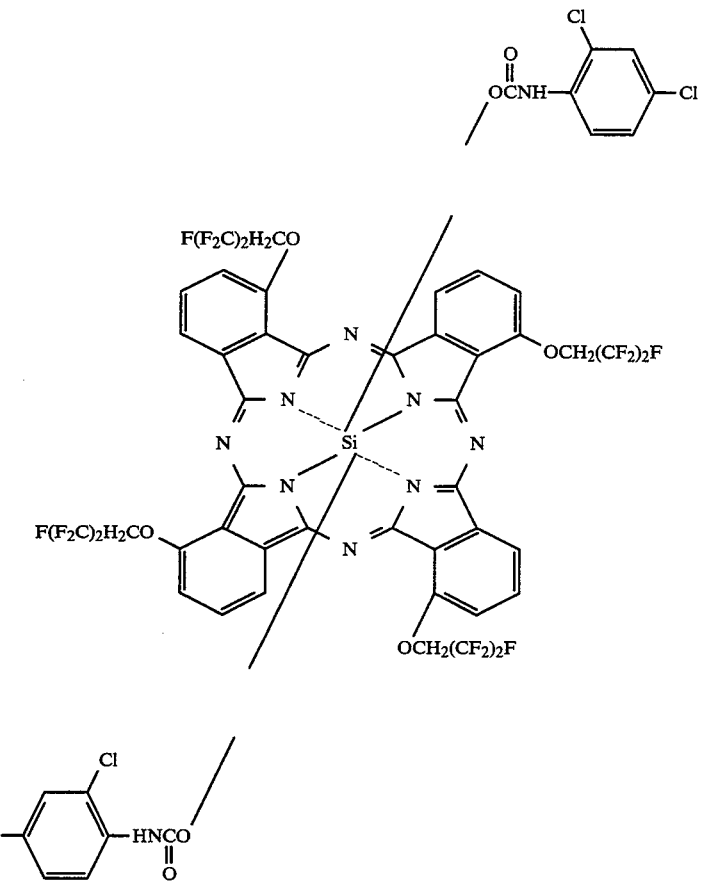
Phthalocyanine compound (6)
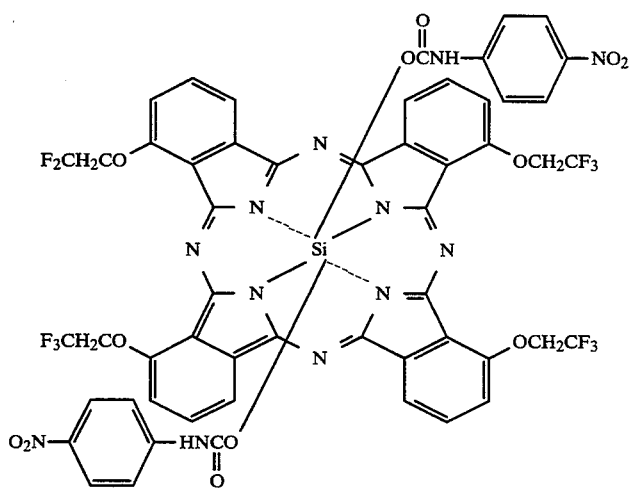
Phthalocyanine compound (7)

-continued
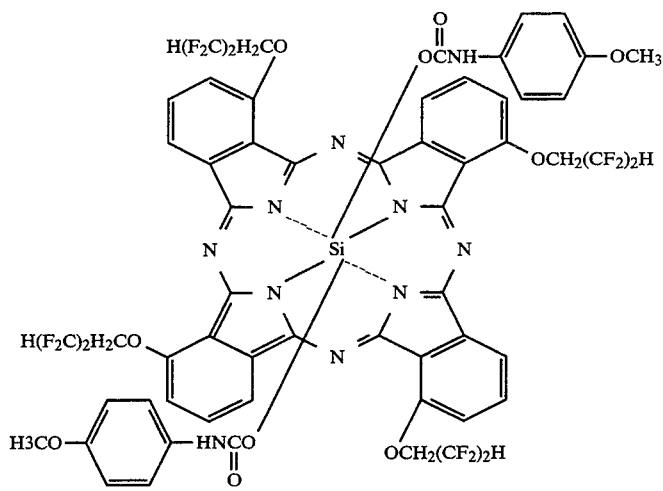
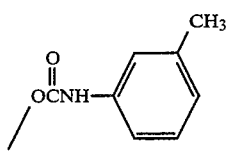
Phthalocyanine compound (8)
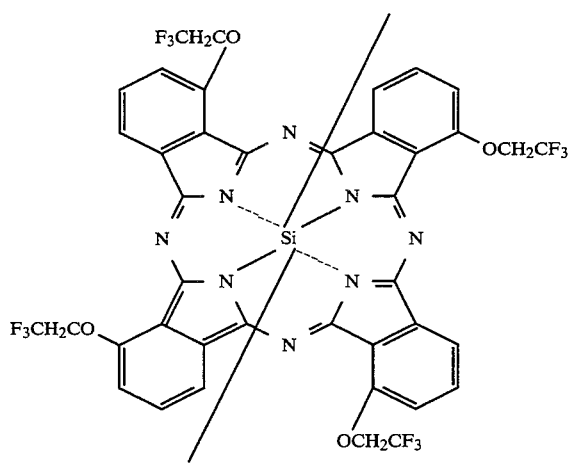
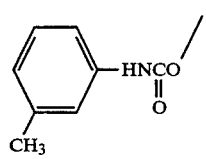
Phthalocyanine compound (9)

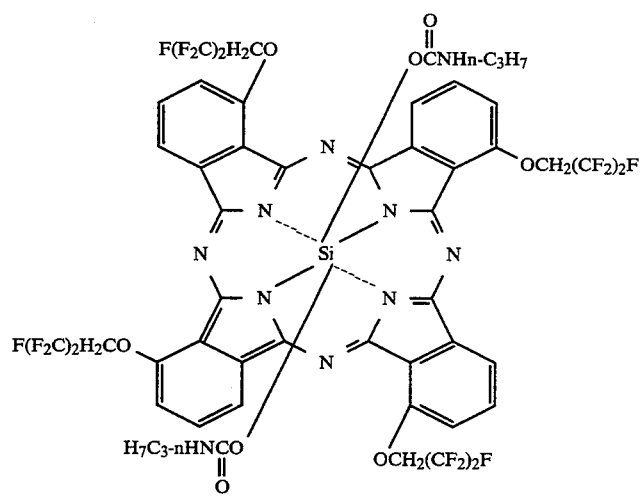
Phthalocyanine compound (10)
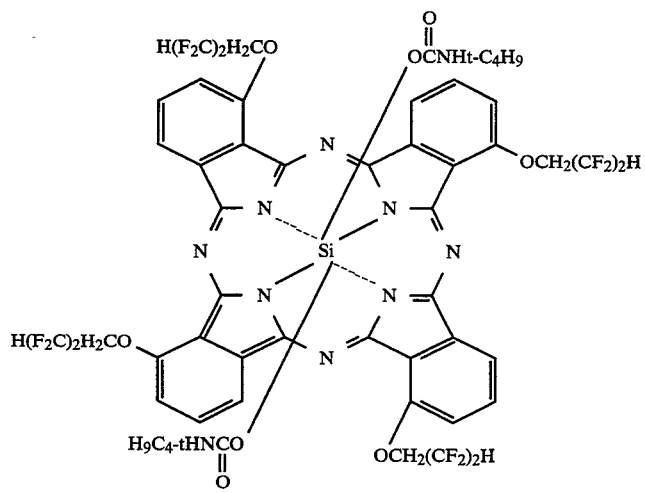
Phthalocyanine compound (11)
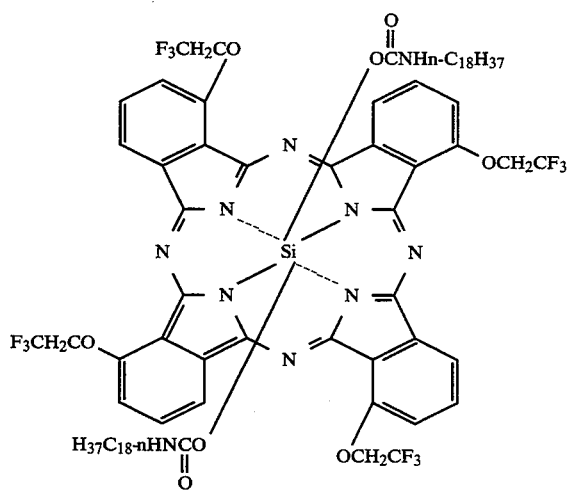
Phthalocyanine compound (12)

-continued
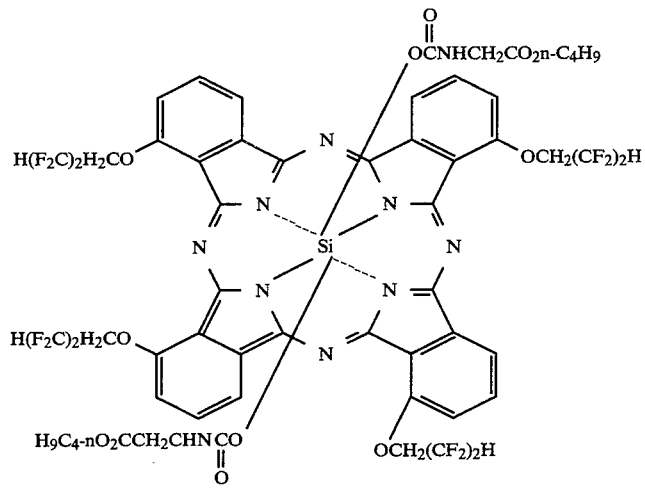
Phthalocyanine compound (13)
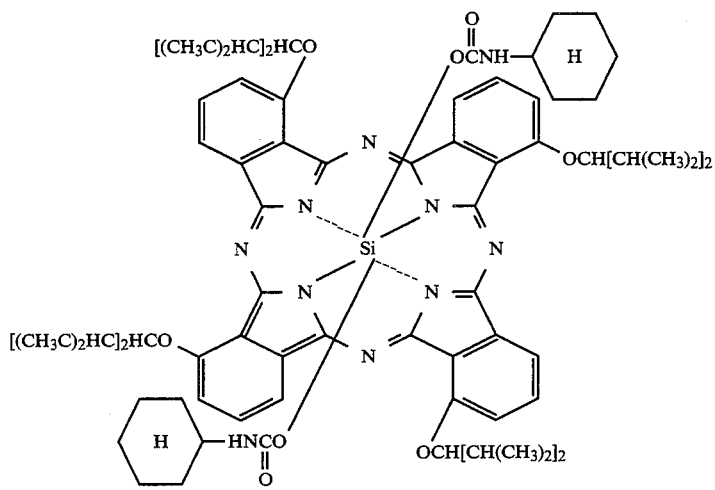
Phthalocyanine compound (14)
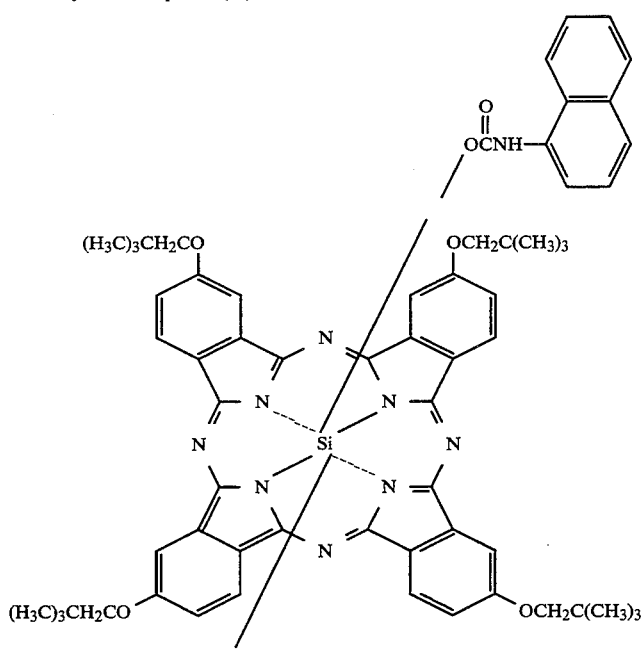

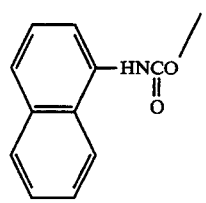
Phthalocyanine compound (15)
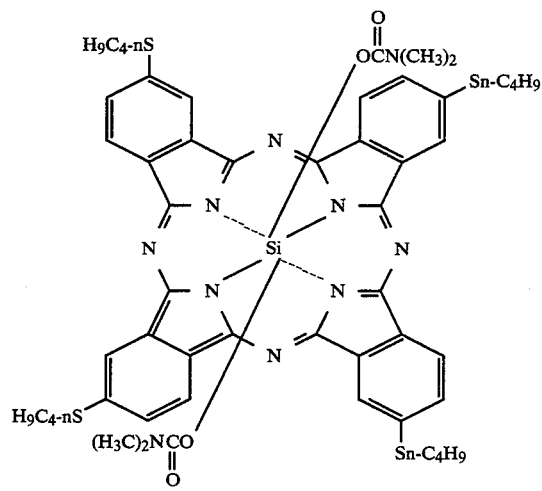
Phthalocyanine compound (16)
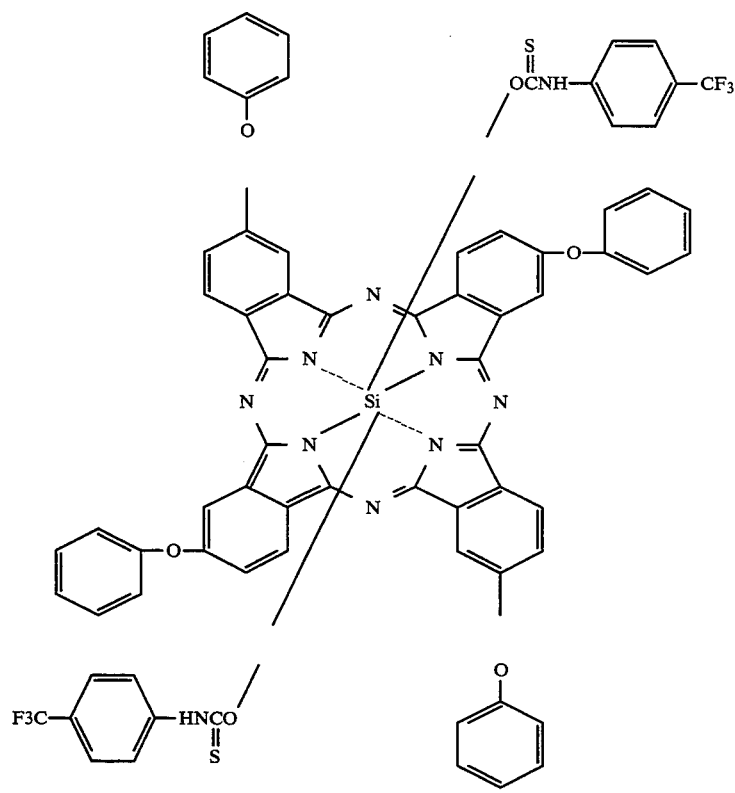
Phthalocyanine compound (17)

-continued
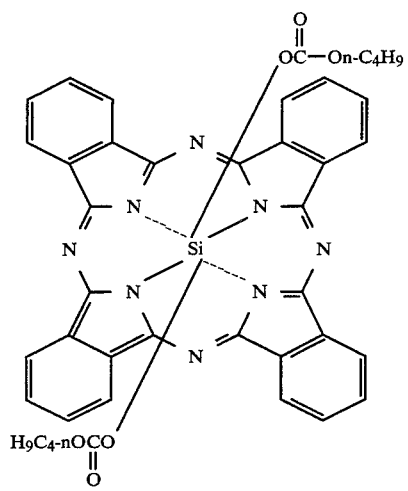
Phthalocyanine compound (18)
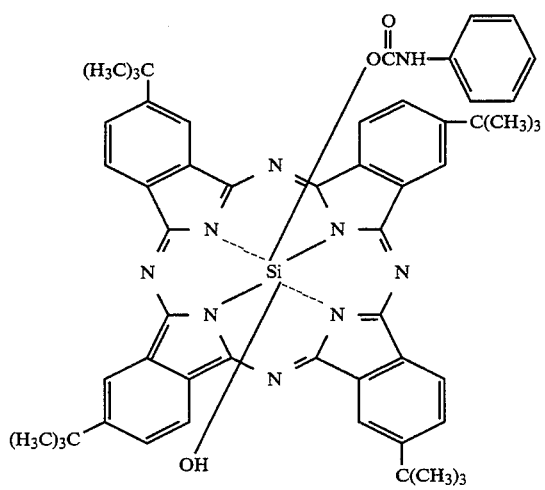
Phthalocyanine compound (19)
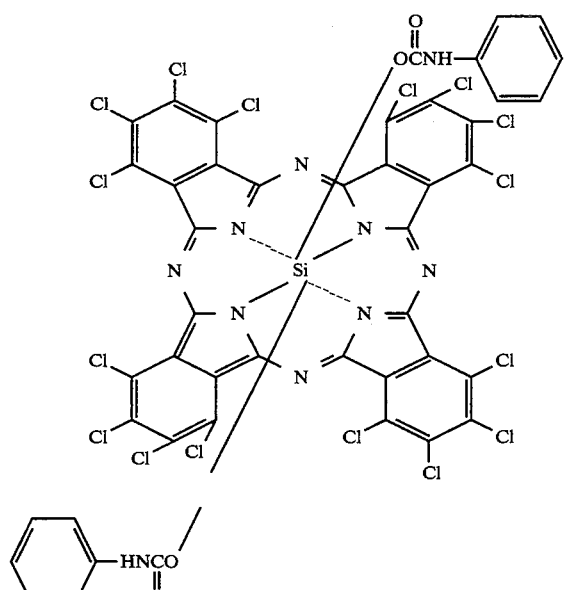
Phthalocyanine compound (20)

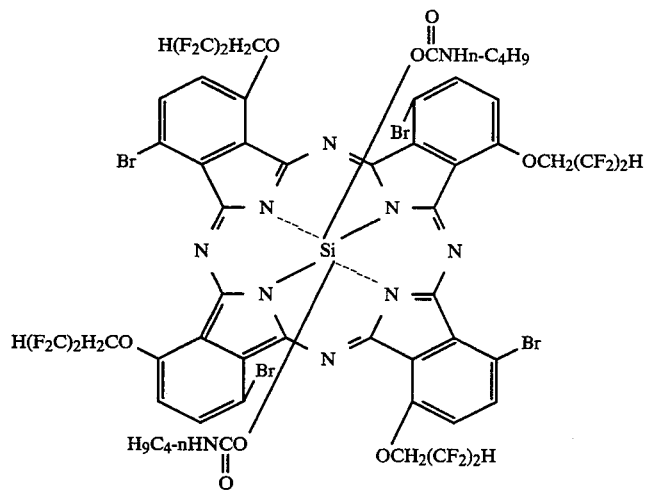
Phthalocyanine compound (21)
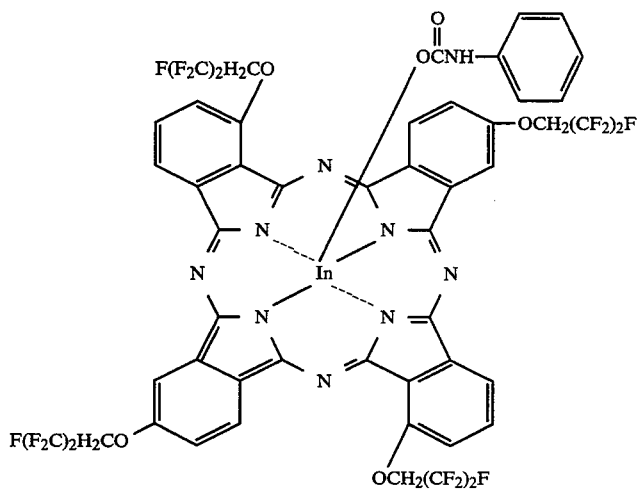
Phthalocyanine compound (22)
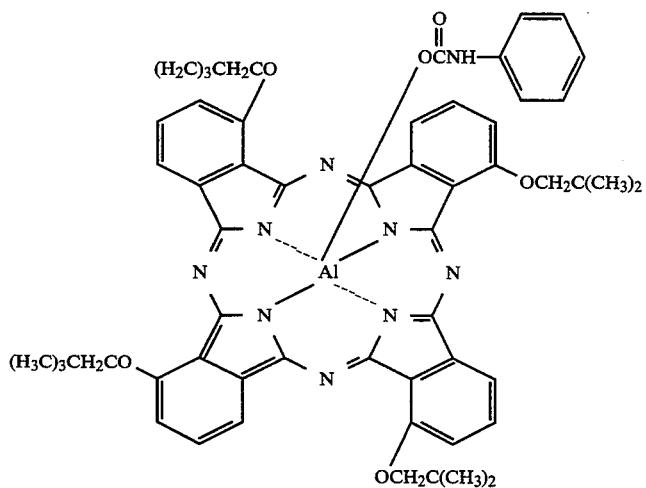
Phthalocyanine compound (23)

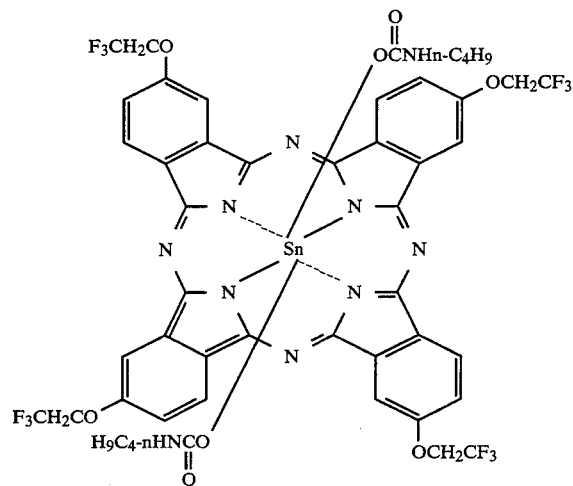
Phthalocyanine compound (24)
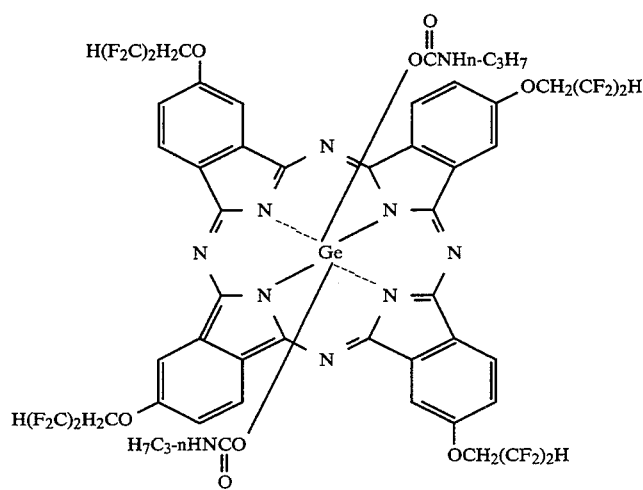
Phthalocyanine compound (25)
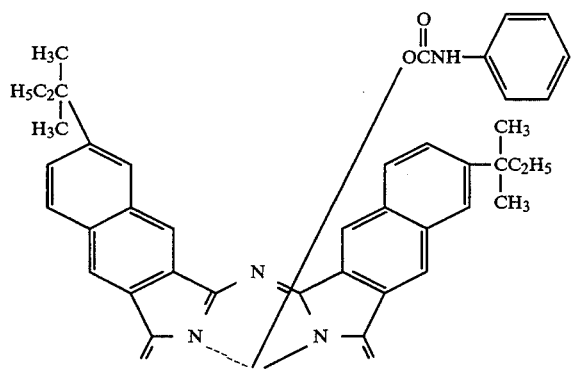

-continued
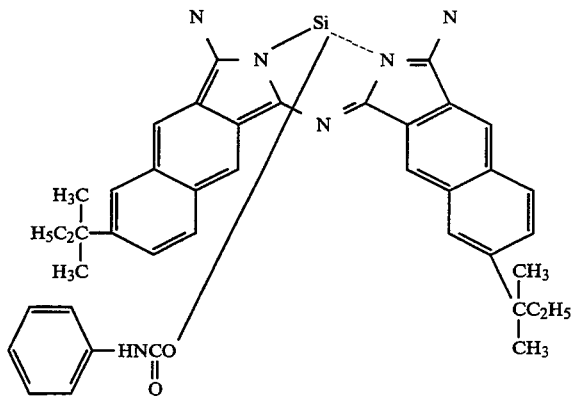
Phthalocyanine compound (26)
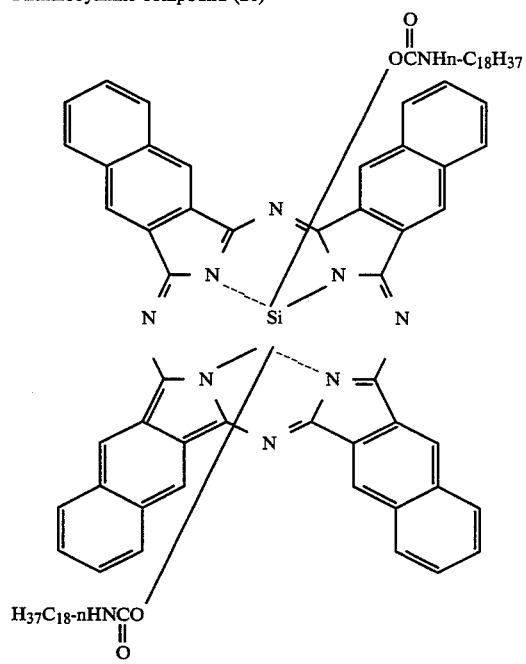
Phthalocyanine compound (27)
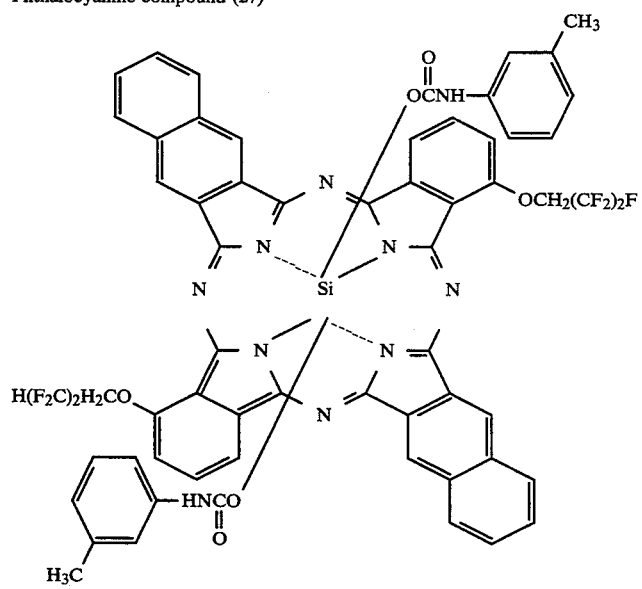
Phthalocyanine compound (28)

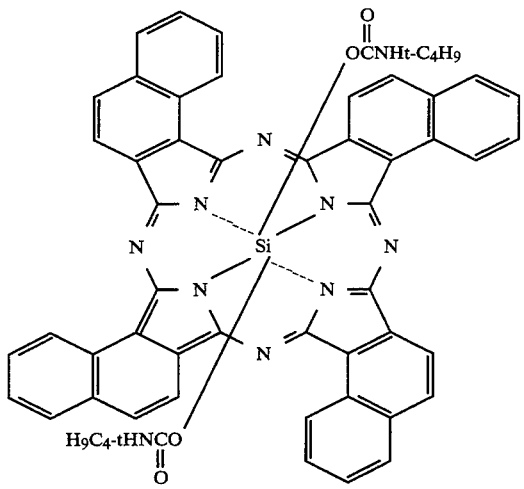

In the present invention, the recording layer is formed of an organic thin layer containing at least one of the phthalocyanine compounds of the formula [1]. The recording layer may further contain additives such as an oxygen quencher and an ultraviolet absorbent for further improving the recording layer in light resistance, stability against an environment and its stability for repeated reproduction.

The recording layer can be formed by a dry method such as a vacuum vapor deposition method or sputtering method, while it can be also formed by a wet method such as a spin coating method, a dipping method, a spray method, a roll coating method or a Langmuir-Blodgett's (LB) method.

The phthalocyanine compounds of the formula [1] are soluble in general organic solvents such as alcohols, ketones, cellosolves, hydrocarbons, halogenated hydrocarbons and chlorofluorocarbons in such an amount that the concentration thereof is approximately 10 to 100 mg/ml. Therefore, a spin coating method is the most preferred for forming the recording layer in view of productivity and uniformity of the recording layer.

When the recording layer is formed by the above coating method, a polymer binder may be added to a coating solution.

The polymer binder is selected from an acrylic resin, a polycarbonate resin, a polyester resin, a polyamide resin, a vinyl chloride resin, a vinyl acetate resin, nitrocellulose and a phenolic resin, although the polymer binder shall not be limited to these.

Although not specially limited, the amount of the polymer binder is 30% by weight or less per 100% by weight of the phthalocyanine compound(s) of the formula [1].

The optical recording medium of the present invention generally has the layer structure of transparent substrate/recording layer/reflection layer/protection layer. The thickness of the recording layer is not specially limited since it differs depending upon kinds and combinations of the phthalocyanine compounds of the formula [1]. When uneven surface formed on the substrate by a guide groove, etc., however, the thickness of the recording layer is preferably 300 to 3,000 angstroms, more preferably 500 to 1,500 angstroms.

The material for forming the reflection layer used in the present invention is selected from metals such as gold, silver, copper, platinum, aluminum, cobalt and tin, alloys composed mainly of these metals, metal oxides such as MgO, ZnO and SnO, and nitrides such as SiN, AlN and TiN. Gold is the most preferred since it gives a reflection layer having high reflectance and high stability.

The reflection layer can be the most preferably produced by a dry method such as a vacuum vapor deposition method, a sputtering method, or the like, although it shall not be so limited.

Although not specially limited, the thickness of the reflection layer is preferably 400 to 1,300 angstroms.

For preventing the chemical deterioration (e.g., oxidation and water absorption) and physical deterioration (e.g., scratch and abrasion) of the medium, a protection layer is formed on the recording layer or the reflection layer.

The material for forming the protection layer is preferably selected from ultraviolet-curing resins, and the protection layer is preferably formed by applying an ultraviolet-curing resin by a spin coating method and curing it under irradiation with ultraviolet light. The protection layer may be also formed by vapor deposition of $SiO_2$ or attaching a resin film. Of course, the protection layer shall not be limited to these.

The thickness of the protection layer is preferably 2 to 20 microns. When this thickness is too small, the protective effect is insufficient. When it is too large, the medium undergoes deterioration of its mechanical properties such as distortion due to the shrinkage of the resin when the resin is cured.

The transparent substrate used in the present invention preferably has a transmittance of at least 85% and low optical anisotropy for writing and reading signals. The material for the transparent substrate is selected from thermoplastic resins such as a polycarbonate resin, a polyester resin, a polyamide resin, a vinyl chloride resin, a polyvinyl ester resin, a polystyrene resin, a polyolefin resin (e.g., poly-4-methylpentene) and a polyether sulfone resin and thermosetting resins such as an epoxy resin and an allyl resin. The transparent substrate can be formed from any one of the above resins by a conventional method. The transparent substrate may be a substrate obtained by vapor depositing $SiO_2$, or the like on the substrate formed of any one of the above resins in view of moldability and the easiness in forming a guide groove and address signals, the above thermoplastic resins are preferred.

In the present invention, the thickness of the transparent substrate is not specially limited, and the transparent substrate may have the form of any one of a plate, a film, a disc and a card, The size of the transparent substrate is not specially limited, either. That is, the transparent substrate is not limited to the disc for a general optical disc, and the optical recording medium of the present invention may be any one of card-shaped, tape-shaped and sheet-shaped recording media.

The transparent substrate used in the present invention usually has a guide groove for position control for recording and reading and a concavoconvex surface form for pre-formatting address signals and various marks, and the concavoconvex surface form including the guide groove are preferably formed by means of a stamper when the above thermoplastic resin is molded. The concavoconvex surface form may be also formed by a so-called photo-polymer (2P) method using a photo-polymer resin.

The cross-sectional form of the guide groove may be any one of rectangular, trapezoidal and U-letter shaped forms.

The dimensions of the guide groove differ depending upon kinds and combinations of materials used for forming the recording layer. In general, the average groove width (measured at a height of ½ from the bottom) is preferably 0.3 to 0.6 microns, and the groove depth is preferably 500 to 2,500 angstroms.

For preventing the chemical deterioration (oxidation and water absorption) and physical deterioration (scratch and abrasion) of the medium, a protection layer may be formed on a laser light-incoming surface side of the transparent substrate, as well as the formation of the protection layer on the reflection layer.

The material for forming the above protection layer on the laser light-incoming surface side is preferably selected from ultraviolet-curing resin, and the protection layer is preferably formed by applying an ultraviolet-curing resin by a spin coating method and curing it under irradiation with ultraviolet light.

The thickness of the above protection layer is preferably 2 to 20 microns. When this thickness is too small, the protective effect is insufficient. When it is too large, the medium undergoes deterioration of its mechanical properties such as distortion due to the shrinkage of the resin when the resin is cured.

Further, for achieving functions other than the function of the protection layer, such as reflection prevention, electric charge prevention or the barrier against humidity, a layer of a material having a low refractive index, a fluorine resin or an electrically conductive resin may be formed on the laser light-incoming surface side Of the transparent substrate, the recording layer or the reflection layer. Otherwise, the protection layer may also contain any one of the above materials to impart the protection layer with the above function(s).

The recording on the so-produced optical recording medium can be carried out by irradiating the recording layer with laser light focussed to a diameter of about 1 microns, preferably with a laser diode. That portion of the recording layer which is irradiated with laser light undergoes a thermal state change such as decomposition, evaporation, melting or diffusion into substrate due to the absorption of laser energy. The reproduction is achieved by reading reflectance differences between portions having heat-induced state changes and portions having no state change. The phthalocyanine compound(s) used in the present invention serves to give a recording layer which shows a very large difference in reflectance between recorded portions and unrecorded portions, i.e., large record signals, and there is therefore provided an optical recording medium having excellent electric properties.

The laser is selected from a variety of lasers such as He-Ne laser, Ar laser, laser diode, and the like. Among these, preferred is a laser diode in view of prices and sizes. Further, preferred is a laser diode whose central wavelength is 770 to 830 rim, while a laser diode having a smaller wavelength may be also used.

The optical recording medium of the present invention typically includes a CD write-once, a direct read after write disc for filings and a write-once laser disc, while it can be also applied to an optical tape, an optical card, and the like.

When the optical recording medium of the present invention is constituted by recording layers alone, two recording media may be attached to each other to form a recording medium both sides of which recording can be effected.

For use of the optical recording medium of the present invention as a write-once disc compatible with CD or CD-ROM, it is preferred to base its disc form, "absolute time in pregroove (ATIP)" on the guide groove, etc., on "red book" (CD standard manual published by Phillips) and "orange book" (CD write-once standard manual published by Phillips).

EXAMPLES

The present invention will be explained more in detail hereinafter by reference to Examples.

First, the production of typical examples of the phthalocyanine compounds used in the present invention will be explained.

PREPARATION EXAMPLE 1

Preparation of Phthalocyanine Compound (3)

13.8 Parts by weight of 4-(2,2,3,3-tetrafluoropropoxy)-1,3-diiminoisoindoline and 6.0 parts by weight of silicon tetrachloride were added to a mixture of 200 parts by weight of o-dichlorobenzene and 30 parts of tri-n-butylamine, and the resultant mixture was stirred in a nitrogen atmosphere under heat at 160° to 170° C. for 6 hours. The reaction mixture was cooled, then diluted with 1,000 parts by weight of hexane, and poured into 2,000 parts of 3% hydrochloric acid. An organic layer was separated and removed, and the remainder was boiled for 1 hour, filtered, washed with water, washed with 2,000 parts by weight of a methanol/water (2/1) mixed solution, and dried to give 7.4 parts by weight of a green powder. 7.0 Parts by weight of this green powder was added to 350 parts by weight of 96% sulfuric acid, and the resultant mixture was stirred for 3 hours and poured into 3,000 parts by weight of ice water. The resultant precipitate was recovered by filtration, washed with water and dried to give 6.4 parts by weight of a greenish blue powder. The FD-MS analysis of this powder showed that it was dihydroxysilicon tetra(2,2,3,3-tetrafluoropropoxy)phthalocyanine.

6.0 Parts by weight of the above-obtained dihydroxysilicon tetra(2,2,3,3-tetrafluoropropoxy)phthalocyanine was dissolved in 120 parts by weight of pyridine with stirring, and then 8.0 parts by weight of phenyl isocyanate was added dropwise. The mixture was stirred at room temperature for 30 minutes, and stirred at 80° C. for 1 hour. The reaction mixture was cooled, then 20 parts by weight of methanol was added, and the mixture was stirred for 15 minutes and then poured into 1,000 parts by weight of 3% hydrochloric acid. The resultant precipitate was recovered by filtration, and washed with water. The so-obtained wet powder was dissolved in 300 parts by weight of methanol, and 75 parts by weight of water was added dropwise to form a precipitate again. The precipitate was recovered by filtration, washed with 200 parts by weight of a methanol/water (3/1) mixture and dried to give 4.0 parts by weight of a green powder. The FD-MS analysis thereof showed that this powder was a phthalocyanine compound (3).

PREPARATION EXAMPLE 2

Preparation of phthalocyanine compound (4)

The procedures of Example 1 were repeated except that 13.8 parts by weight of 4-(2,2,3,3-tetrafluoropropoxy)-1,3-diiminoisoindoline was replaced with 16.9 parts by weight of 4-[2,2-bis(trifluoromethyl)propoxy]-1,3-diiminoisoindoline, to give 6.9 parts by weight of dihydroxysilicon tetra[2,2-bis(trifluoromethyl)propoxy]phthalocyanine as a bluish green powder.

6.0 Parts by weight of the above-obtained dihydroxysilicon tetra[2,2-bis(trifluoromethyl)propoxy]phthalocyanine was allowed to react with phenylisocyanate, and purified, in the same manner as in Example 1 to give 5.1 parts by weight of a green powder. The FD-MS analysis of this powder showed that it was a phthalocyanine compound (4).

PREPARATION EXAMPLE 3

Preparation of phthalocyanine compound (8)

The procedures of Example 1 were repeated except that 13.8 parts by weight of 4-(2,2,3,3-tetrafluoropropoxy)-1,3-diiminoisoindoline was replaced with 12.2 parts by weight of 4-(2,2,2-trifluoroethoxy)-1,3diiminoisoindoline, to give 7.8 parts by weight of dihydroxysilicon tetra(2,2,2-trifluoroethoxyphthalocyanine as a bluish green powder.

6.0 Parts by weight of the above-obtained dihydroxysilicon tetra(2,2,2-trifluoroethoxy)phthalocyanine was dissolved in 120 parts by weight of 1,4-dioxane with stirring, and 10 parts by weight of m-tolyl isocyanate and 0.5 part by weight of dibutyltin dilaurate were added. The mixture was stirred under heat at 90° C. for 1 hour. After cooled, the reaction mixture was poured into 200 parts by weight of methanol, and 100 parts by weight of water was added to obtain a harz-like precipitate. The precipitate was dissolved in chloroform and dried over magnesium sulfate, and chloroform was distilled off to give a dark green oily substance. The oily substance was subjected to silica gel column chromatography (chloroform) to give 4.0 parts by weight of a green powder. The FD-MS analysis of this powder showed that it was a phthalocyanine compound (8).

EXAMPLE 4

Preparation of phthalocyanine compound (9)

2.2 Parts by weight of dihydroxysilicon (2,2,3,3-tetrafluoropropoxy)phthalocyanine synthesized in the same manner as in Example 1 was dissolved in 80 parts by weight of 1,4-dioxane with stirring. Then, 3.4 parts by weight of n-propylisocyanate and 0.5 part by weight of dibutyltin dilaurate were added, and the mixture was stirred under heat at 90° C. for 1 hour. After cooled, the reaction mixture was poured into 200 parts by weight of methanol, and 100 parts by weight of water was added to form a precipitate. The precipitate was recovered by filtration, washed with water, dissolved in 200 parts by weight of chloroform, and dried over magnesium sulfate. Chloroform was distilled off to give a green powder. This powder was subjected to silica gel column chromatography (chloroform) for purification and isolation to give 1.4 parts by weight of a green powder. The FD-MS analysis of this powder showed that it was a phthalocyanine compound (9).

PREPARATION EXAMPLE 5

Preparation of phthalocyanine compound (11)

2.0 Parts by weight of dihydroxysilicon (2,2,2-trifluoropropoxy)phthalocyanine synthesized in the same manner as in Example 3 was dissolved in 80 parts by weight of 1,4-dioxane with stirring. Then, 12 parts by weight of n-octadecyl isocyanate and 0.5 part by weight of dibutyl tin dilaurate were added, and the mixture was stirred under heat at 90° C. for 1 hour. After cooled, the reaction mixture was poured into 200 parts by weight of methanol, insolubles were removed, and 100 parts by weight of water was added to form a harz-like precipitate. The precipitate was dissolved in chloroform, and dried over magnesium sulfate. Chloroform was distilled off to give a dark green oily substance. This oily substance was subjected to silica gel column chromatography (chloroform) for purification and isolation to give 1.3 parts by weight of a green powder. The FD-MS analysis of this powder showed that it was a phthalocyanine compound (11).

PREPARATION EXAMPLE 6

Preparation of phthalocyanine compound (13)

The procedures of Example 1 were repeated except that 13.8 parts by weight of 4-(2,2,3,3-tetrafluoropropoxy)-1,3-diiminoisoindoline was replaced with 13.0 parts by weight of 4-(2,4-dimethyl-3-pentyloxy)-1,3-diiminoisoindoline, to give 6.8 parts by weight of dihydroxysilicon tetra(2,4-dimethyl-3-pentyloxy)phthalocyanine as a green powder.

2.0 Parts by weight of the above-obtained dihydroxysilicon tetra(2,4-dimethyl -3-pentyloxy)phthalocyanine was dissolved in 80 parts by weight of 1,4-dioxane with stirring. Then, 5 parts by weight of cyclohexylisocyanate and 0.3 part by weight of dibutyltin dilaurate were added, and the mixture was stirred under heat at 90° C. for 1 hour. After cooled, the reaction mixture was poured into 200 parts by weight of methanol, and 100 parts by weight of water was added to form a harz-like precipitate. The precipitate was dissolved in chloroform, and dried over magnesium sulfate. Chloroform was distilled off to give a dark green oily substance. This oily substance was subjected to silica gel column chromatography (chloroform) for purification and isolation to give 4.0 parts by weight of a green powder. The FD-MS analysis of this powder showed that it was a phthalocyanine compound (13).

PREPARATION EXAMPLE 7

Preparation of phthalocyanine compound (15)

The procedures of Example 1 were repeated except that 13.8 parts by weight of 4-(2,2,3,3-tetrafluoropropoxy)-1,3-diiminoisoindoline was replaced with 11.6 parts by weight of 5-n-butylthio-1,3-diiminoisoindoline to give 5.7 parts by weight of dihydroxysilicon tetra-n-butyl thiopentyloxy)phthalocyanine as a green powder.

5.0 Parts by weight of the above-obtained dihydroxysilicon tetra-n-butyl thiophthalocyanine was dissolved in 100 parts by weight of pyridine with stirring, and while tile mixture was cooled, 5.0 parts by weight of dimethylcarbamoyl chloride was added dropwise. The mixture was stirred at room temperature for 1 hour and stirred at 40° C. for 2 hours. After cooled, the reaction mixture was poured into 2,000 parts by weight of ice water to form a harz-like precipitate. The precipitate was dissolved in chloroform, and dried over magnesium sulfate. Chloroform was distilled off to give a dark green oily substance. This oily substance was subjected to silica gel column chromatography (chloroform) for purification and isolation to give 3.1 parts by weigh t of a green powder. The FD-MS analysis of this powder showed that it was a phthalocyanine compound (15).

PREPARATION EXAMPLE 8

Preparation of phthalocyanine compound (20)

The procedures of Example 1 were repeated except that 13.8 parts by weight of 4-(2,2,3,3-tetrafluoropropoxy)-1,3-diiminoisoindoline was replaced with 13.4 parts by weight of 4-bromo-7-(2,2,3,3-tetrafluoropropoxy)-1,3-diiminoisoindoline to give 3.8 parts by weight of dihydroxysilicon tetrabromotetra(2,2,3,3-tetrafluoropropoxy)phthalocyanine as a green powder.

2.5 Parts by weight of the above-obtained dihydroxysilicon tetrabromotetra(2,2,3,3-tetrafluoropropoxy)phthalocyanine was dissolved in 80 parts by weight of 1,4-dioxane with stirring. Then, 4.8 parts by weight of n-butylisocyanate and 0.3 part by weight of dibutyltin dilaurate were added, and the mixture was stirred under heat at 90° C. for 1 hour. After cooled, the reaction mixture was poured into 200 parts by weight of methanol, and 100 parts by weight of water was added to form a harz-like precipitate. The precipitate was dissolved in chloroform, and dried over magnesium sulfate. Chloroform was distilled off to give a dark green oily substance. This oily substance was subjected to silica gel column chromatography (chloroform) for purification and isolation to give 1.2 parts by weight of a green powder. The FD-MS analysis of this powder showed that it was a phthalocyanine compound (20).

PREPARATION EXAMPLE 9

Preparation of phthalocyanine compound (22)

11 Parts by weight of 4-neopentyloxy-1,3-diiminoisoindoline, 10 parts by weight of tri-n-butylamine and 2.3 parts by weight of aluminum chloride were added to 100 parts by weight of 1-chloronaphthalene, and the mixture was stirred at 160° to 180° C. for 6 hours. After cooled, the reaction mixture was poured into 1,000 parts by weight of hexane, and tile formed harz-like precipitate was isolated, boiled in 2,000 parts of 3% hydrochloric acid for 1 hour, filtered, washed with water and dried to give 5.0 parts by weight of a green powder. 5.0 Parts by weight of this green powder was 250 parts by weight of 96% sulfuric acid, and the mixture was stirred for 6 hours and poured into 300 parts by weight of ice water to form a precipitate. The precipitate was recovered by filtration, washed with water and dried to give 3.8 parts by weight of a green powder. The FD-MS analysis of this powder showed that it was a hydroxyaluminumtetraneopentoxyphthalocyanine.

1.9 Parts by weight of the above-obtained hydroxyaluminumtetraneopentoxyphthalocyanine was dissolved in 80 parts by weight of 1,4-dioxane with stirring. Then, 2.5 parts by weight of phenyl isocyanate and 0.3 part by weight of dibutyl tin dilaurate were added, and the mixture was stirred under heat at 90° C. for 1 hour. After cooled, the reaction mixture was poured into 200 parts by weight of methanol, and 100 parts by weight of water was added to form a harz-like precipitate. The precipitate was dissolved in chloroform, and dried over magnesium sulfate. Chloroform was distilled off to give a dark green oily substance. This oily substance was subjected to silica gel column chromatography (chloroform) for purification and isolation to give 4.0 parts by weight of a green powder. The FD-MS analysis of this powder showed that it was a phthalocyanine compound (22).

PREPARATION EXAMPLE 10

Preparation of phthalocyanine compound (25)

The procedures of Example I were repeated except that 13.8 parts by weight of 4-(2,2,3,3-tetrafluoropropoxy)-1,3-diiminoisoindoline was replaced with 24 parts by weight of 6-t-amyl-1,3-diiminobenzoisoindoline to give 12 parts by weight of dihydroxysilicon tetra-t-amylnaphthalocyanine.

3 Parts by weight of the above-obtained dihydroxysilicontetra-t-amylnaphthalocyanine was dissolved in 200 parts by weight of pyridine with stirring, and then 5.3 parts by weight of phenyl isocyanate and 0.5 part by weight of dibutyl tin dilaurate were added. The mixture was stirred under heat at 90° C. for 1 hour. After cooled, the reaction mixture was poured into 200 parts by weight of methanol, insolubles were removed, and 200 parts by weight of water was added to form a harz-like precipitate. The precipitate was dissolved in chloroform and dried over magnesium sulfate, and chloroform was distilled off to give a dark green harz-like substance. This dark green harz-like substance was subjected to silica gel column chromatography (chloroform) for purification and isolation to give 1.0 parts by weight of a dark greenish brown powder. The FD-MS analysis of this powder showed that it was a phthalocyanine compound (25).

EXAMPLE 1

The phthalocyanine compound (3) was dissolved in diacetone alcohol in a concentration of 60 mg/ml, and filtered through a filter having openings whose diameters were 0.2 microns to obtain a coating solution. This coating solution was coated on a polycarbonate substrate having a guide groove (depth 1,200 angstroms, width 0.4 microns, pitch 1.6 microns), a thickness of 1.20 mm, an outer diameter of 120 mm and an inner diameter of 15 mm with a spin coater to form a coating (recording layer) having a thickness of 1,000 angstroms.

Then, gold was sputtered on the above recording layer to form a gold layer having a thickness of 800 angstroms. Further, a protection layer having a thickness of 5 microns was formed from an ultraviolet-curing resin on the gold layer to give an optical disc.

The above-obtained optical disc showed a reflectance of 69% at a wavelength of 785 nm.

When an at tempt was made to record EFM-CD format signals on the above optical disc with a laser diode having a wavelength of 785 nm and NA of 0.5 at a linear velocity of 1.4 m/sec, the signals were recorded at an optimum recording laser power of 7.4 mW. When the signals were reproduced with a CD player at a laser power of 0.5 row, the reproduced signals were excel lent and the C/N ratio was 52 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued for about 1,000 hours.

EXAMPLE 2

The phthalocyanine compound (4) was dissolved in ethyl cellosolve in a concentration of 50 mg/ml, and filtered through a filter having openings whose diameters were 0.2 microns to obtain a coating solution. This coating solution was coated on a polycarbonate substrate having a guide groove (depth 1,000 angstroms, width 0.35 microns, pitch 1.6 microns), a thickness of 1.20 mm, an outer diameter of 120 mm and an inner diameter of 15 mm with a spin coater to form a coating (recording layer) having a thickness of 800 angstroms.

Then, gold was spot toted on the above recording layer to form a gold layer having a thickness of 800 angstroms. Further, a protection layer having a thickness of 5 microns was formed from an ultraviolet-curing resin on the gold layer to give an optical disc.

The above-obtained optical disc showed a reflectance of 72% at a wavelength of 785 nm.

When an at tempt was made to record EFM-CD format signals on the above optical disc with a laser diode having a wavelength of 785 nm and NA of 0.5 at a linear velocity of 1.4 m/sec, the signals were recorded at an optimum recording laser power of 7.6 row. When the signals were reproduced with a CD player at a laser power of 0.5 mW, the reproduced signals were excellent and the C/N ratio was 50 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued for about 1,000 hours.

EXAMPLE 3

The phthalocyanine compound (8) was dissolved in cyclooctane in a concentration of 50 mg/ml, and filtered through a filter having openings whose diameters were 0.2 microns to obtain a coating solution. This coating solution was coated on a polycarbonate substrate having a guide groove (depth 1,500 angstroms, width 0.45 microns, pitch 1.6 microns), a thickness of 1.20 mm, an outer diameter of 120 mm and an inner diameter of 15 mm with a spin coater to form a coating (recording layer) having a thickness of 600 angstroms.

Then, gold was sputtered on the above recording layer to form a gold layer having a thickness of 800 angstroms. Further, a protection layer having a thickness of 5 microns was formed from an ultraviolet-curing resin on the gold layer to give an optical disc.

The above-obtained optical disc showed a reflectance of 66% at a wavelength of 785 rim.

When an at tempt was made to record EFM-CD format signals on the above optical disc with a laser diode having a wavelength of 785 nm and NA of 0.5 at a linear velocity of 1.4 m/sec, the signals were recorded at an optimum recording laser power of 7.2 mW. When the signals were reproduced with a CD player at a laser power of 0.5 mW, the reproduced signals were excel lent and the C/N ratio was 54 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued for about 1,000 hours.

EXAMPLE 4

The phthalocyanine compound (9) was dissolved in 1,1,2,2-tetrafluoropropanol in a concentration of 30 mg/ml, and filtered through a filter having openings whose diameters were 0.2 microns to obtain a coating solution. This coating solution was coated on a polycarbonate substrate having a guide groove (depth 1,800 angstroms, width 0.45 microns, pitch 1.6 microns), a thickness of 1.20 mm, an outer diameter of 120 mm and an inner diameter of 15 mm with a spin coater to form a coating (recording layer) having a thickness of 800 angstroms.

Then, gold was sputtered on the above recording layer to form a gold layer having a thickness of 800 angstroms. Further, a protection layer having a thickness of 5 microns was formed from an ultraviolet-curing resin on the gold layer to give an optical disc.

The above-obtained optical disc showed a reflectance of 68% at a wavelength of 785 nm.

When an at tempt was made to record EFM-CD format signals on the above optical disc with a laser diode having a wavelength of 785 nm and NA of 0.5 at a linear velocity of 1.4 m/sec, the signals were recorded at an optimum recording laser power of 6.8 mW. When the signals were reproduced with a CD player at a laser power of 0. 5 mW, the reproduced signals were excellent and the C/N ratio was 57 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued for about 1,000 hours.

EXAMPLE 5

The phthalocyanine compound (11) was dissolved in ethyl cellosolve in a concentration of 50 mg/ml, and filtered through a filter having openings whose diameters were 0.2 microns to obtain a coating solution. This coating solution was coated on a polycarbonate substrate having a guide groove (depth 1,000 angstroms, width 0.35 microns, pitch 1.6 microns), a thickness of 1.20 mm, an outer diameter of 120 mm and an inner diameter of 15 mm with a spin coater to form a coating (recording layer) having a thickness of 800 angstroms.

Then, a gold/copper (=4/1) alloy was sputtered on the above recording layer to form an alloy layer having a thickness of 800 angstroms. Further, a protection layer having a thickness of 5 microns was formed from an ultraviolet-curing resin on the alloy layer to give an optical disc.

The above-obtained optical disc showed a reflectance of 68% at a wavelength of 785 nm.

When an attempt was made to record EFM-CD format signals on the above optical disc with a laser diode having a wavelength of 785 nm and NA of 0.5 at a linear velocity of 1.4 m/sec, the signals were recorded at an optimum recording laser power of 7.2 mW. When the signals were reproduced with a CD player at a laser power of 0.5 mW, the reproduced signals were excellent and the C/N ratio was 48 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued fox- about 1,000 hours.

EXAMPLE 6

The phthalocyanine compound (13) was dissolved in cyclooctaine in a concentration of 50 mg/ml, and filtered through a filter having openings whose diameters were 0.2 microns to obtain a coating solution. This coating solution was coated on a polycarbonate substrate having a guide groove (depth 1,500 angstroms, width 0.45 microns, pitch 1.6 microns), a thickness of 1.20 mm, an outer diameter of 120 mm and an inner diameter of 15 mm with a spin coater to form a coating (recording layer) having a thickness of 600 angstroms.

Then, gold was vacuum vapor-deposited on the above recording layer to form a gold layer having a thickness of 1,000 angstroms. Further, a protection layer having a thickness of 5 microns was formed from an ultraviolet-curing resin on the gold layer to give an optical disc.

The above-obtained optical disc showed a reflectance of 74% at a wavelength of 785 rim.

When an at tempt was made to record EFM-CD format signals on the above optical disc with a laser diode having a wavelength of 785 nm and NA of 0.5 at a linear velocity of 1.4 m/sec, the signals were recorded at an optimum recording laser power of 7.4 row. When the signals were reproduced with a CD player at a laser power of 0.5 mW, the reproduced signals were excellent and the C/N ratio was 53 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued for about 1,000 hours.

EXAMPLE 7

The phthalocyanine compound (15) was dissolved in 1,1,2,2-tetrafluoropropanol in a concentration of 30 mg/ml, and filtered through a filter having openings whose diameters were 0.2 microns to obtain a coating solution. This coating solution was coated on a polycarbonate substrate having a guide groove (depth 800 angstroms, width 0.55 microns, pitch 1.6 microns), a thickness of 1.20 mm, an outer diameter of 120 mm and an inner diameter of 15 mm with a spin coater to form a coating (recording layer) having a thickness of 800 angstroms.

Then, a gold/cobalt (=9/1) alloy was sputtered on the above recording layer to form an alloy layer having a thickness of 800 angstroms. Further, a protection layer having a thickness of 5 microns was formed from an ultraviolet-curing resin on the gold layer to give an optical disc.

The above-obtained optical disc showed a reflectance of 76% at a wavelength of 785 nm.

When an attempt was made to record EFM-CD format signals on the above optical disc with a laser diode having a wavelength of 785 nm and NA of 0.5 at a linear velocity of 1.4 m/sec, the signals were recorded at an optimum recording laser power of 7.8 mW. When the signals were reproduced with a CD player at a laser power of 0.5 mW, the reproduced signals were excellent and the C/N ratio was 51 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued for about 1,000 hours.

EXAMPLE 8

The phthalocyanine compound (20) was dissolved in ethyl cellosolve in a concentration of 50 mg/ml, and filtered through a filter having openings whose diameters were 0.2 microns to obtain a coating solution. This coating solution was coated on a polycarbonate substrate having a guide groove (depth 1,000 angstroms, width 0.35 microns, pitch 1.6 microns), a thickness of 1.20 mm, an outer diameter of 120 mm and an inner diameter of 15 mm with a spin coater to form a coating (recording layer) having a thickness of 800 angstroms.

Then, a gold/copper (=4/1) alloy was sputtered on the above recording layer to form a gold layer having a thickness of 700 angstroms. Further, a protection layer having a thickness of 5 microns was formed from an ultraviolet-curing resin on the gold layer to give an optical disc.

The above-obtained optical disc showed a reflectance of 69% at a wavelength of 785 rim.

When an at tempt was made to record EFM-CD format signals on the above optical disc with a laser diode having a wavelength of 785 nm and NA of 0.5 at a linear velocity of 1.4 m/sec, the signals were recorded at an optimum recording, laser power of 7.0 mW. When the signals were reproduced with a CD player at a laser power of 0.5 row, the reproduced signals were excellent and the C/N ratio was 52 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued for about 1,000 hours.

EXAMPLE 9

The phthalocyanine compound (22) was dissolved in cyclooctaine in a concentration of 50 mg/ml, and filtered through a filter having openings whose diameters were 0.2 microns to obtain a coating solution. This coating solution was coated on a polycarbonate substrate having a guide groove (depth 1,500 angstroms, width 0.45 microns, pitch 1.6 microns), a thickness of 1.20 mm, an outer diameter of 120 mm and an inner diameter of 15 mm with a spin coater to a coating (recording layer) having a thickness of 600 angstroms.

Then, gold was sputtered on the above recording layer to form a gold layer having a thickness of 1,000 angstroms. Further, a protection layer having a thickness of 5 microns was formed from an ultraviolet-curing resin on the gold layer to give an optical disc.

Further, a fluorine resin having a refractive index of 1.35 was coated on the laser light-incoming side of the polycarbonate substrate to form an anti-reflection layer having a thickness of 0.2 microns.

The above-obtained optical disc showed a reflectance of 81% at a wavelength of 785 nm.

When an attempt was made to record EFM-CD format signals on the above optical disc with a laser diode having a wavelength of 785 nm and NA of 0.5 at a linear velocity 1.4 m/sec, the signals were recorded at an optimum recording laser power of 7.0 row. When the signals were reproduced with a CD player at a laser power of 0.5 row, the reproduced signals were excellent and the C/N ratio was 56 dB, that is, the recorded signals were sufficiently reproducible with commercially available CD players.

The above optical disc was tested for light resistance by irradiating it with a xenon lamp at 50,000 Lx to show no deterioration of recorded signals when the test was continued for about 1,000 hours. Further, the above optical disk was also tested for stability against an environment at a high temperature (60° C.) at a high humidity (90% RH) to show no deterioration of recorded signals when the test was continued for about 1,000 hours.

EXAMPLE 10

The phthalocyanine compound (25) was dissolved in chloroform in a concentration of 30 mg/ml, and filtered through a filter having openings whose diameters were 0.2 microns to obtain a coating solution. This coating solution was coated on a polycarbonate substrate having a guide groove (depth 700 angstroms, width 0.55 microns, pitch 1.6 microns), a thickness of 1.20 mm, an outer diameter of 130 mm and an inner diameter of 15 mm with a spin coater to form a coating (recording layer) having a thickness of 780 angstroms.

The so-formed coating was dried at 70° C. for 20 minutes to give an optical disc having a constitution of a single recording layer alone.

The above-obtained optical disc showed a maximum absorption wavelength of 815 rim, and a reflectance, from the transparent substrate side, of 34% at a wavelength of 830 nm.

The above-obtained optical disc was set on a turn table, and while it was rotated at 1,800 rpm, a recording at 5 mW and 8 MHz was carried out with 830 nm laser light which was focussed to 1.0 microns in diameter.

The recording layer surface of the optical disc with recorded data was observed through a scanning electron microscope to show the formation of clear pi is. Further, when the optical disc was exposed to laser light having a wavelength of 830 nm and a power of 0.4 mW to detect reflected light, the C/N ratio was 53 dB.

What is claimed is:

1. An optical recording medium comprising a transparent substrate and a recording layer formed on the substrate, the recording layer being formed of an organic thin layer containing at least one phthalocyanine compound of the formula [1],

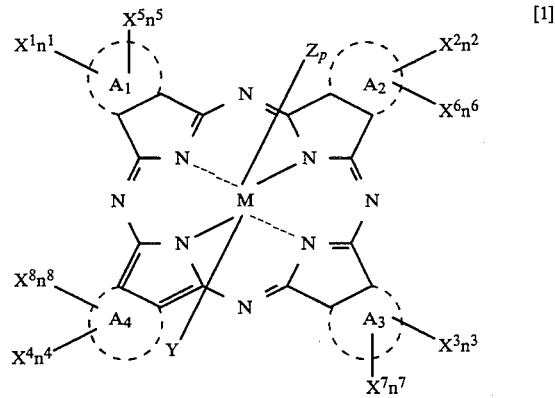

wherein:
each of rings $A^1$ to $A^4$ is independently a benzene ring or a naphthalene ring,
M is Al, Ca, In, Si, Ge or Sn,
each of $X^1$ to $X^8$ is independently a hydrogen atom, an optionally substituted alkyl group, an optionally substituted aryl group, an optionally substituted aralkyl group, an optionally substituted heterocyclic ring residue, an optionally substituted phthalimidemethyl group, a halogen atom, a nitro group, a cyano group, a sulfonic acid group, $-OR^1$, $-SR^2$, $-COOR^3$, $-NR^4R^5$, $-SO_2NR^6R^7$, $-CONR^8R^9$, $-CH_2NH-COCH_2NR^{10}R^{11}$, $-NHCOR^{12}$, $-N=NR^{13}$ or $-N-CHR^{14}$, in which each of $R^1$, $R^2$, $R^3$, $R^4$, $R^5$, $R^6$, $R^7$, $R^8$, $R^9$, $R^{10}$ and $R^{11}$ is independently a hydrogen atom, an optionally substituted alkyl group, an optionally substituted aryl group, an optionally substituted acyl group, an optionally substituted cycloalkyl group or an optionally substituted polyether group, provided that a combination of $R^6$ and $R^7$, a combination of $R^8$ and $R^9$ or a combination of $R^{10}$ and $R^{11}$ may form a four to seven-membered ring which may contain a nitrogen atom as a heteroatom, and each of $R^{12}$, $R^{13}$ and $R^{14}$ is an optionally substituted alkyl group, an optionally substituted cycloalkyl group or an optionally substituted aryl group, Y is

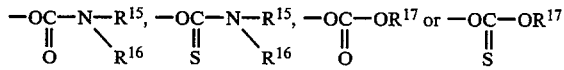

Z is a hydrogen atom, a halogen atom, a hydroxyl group, an optionally substituted alkyl group,

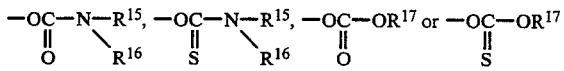

in which each of $R^{15}$, $R^{16}$ and $R^{17}$ is independently a hydrogen atom, an optionally substituted linear, branched or cyclic alkyl group, an optionally substituted aryl group or an optionally substituted aralkyl group, provided that a combination of $R^{15}$ and $R^{16}$ may form a heterocyclic group containing a heteroatom, each of $n^1$ to $n^8$ is independently an integer of 0 to 8, and p is 0 or 1.

2. An optical recording medium comprising a laminate structure of transparent substrate/recording layer/reflection layer/protection layer, the recording layer being formed of an organic thin layer containing at least one phthalocyanine compound of the formula [1] recited in claim 1.

3. An optical recording medium according to claim 1, wherein the recording layer contains a compound of the formula [1] in which each of $X^1$ to $X^8$ is a fluorine-substituted alkoxy group.

4. An optical recording medium according to claim 2, wherein the recording layer contains a compound of the formula [1] in which each of $X^1$ to $X^8$ is a fluorine-substituted alkoxy group.

* * * * *

UNITED STATES PATENT AND TRADEMARK OFFICE
CERTIFICATE OF CORRECTION

PATENT NO. : 5,348,840
DATED : September 20, 1994
INVENTOR(S) : MAKOTO SAKAMOTO and MICHIKO TAMANO It is certified that error appears in the above-indentified patent and that said Letters Patent is hereby corrected as shown below:

Column 40, line 47, change "Ca" to —Ga—;

line 58, change "–N–CHR$^{14}$" to — –N=CHR$^{14}$—.

Signed and Sealed this

Thirty-first Day of January, 1995

Attest:

BRUCE LEHMAN

*Attesting Officer*     *Commissioner of Patents and Trademarks*